H. ELLIOTT
GEARING FOR REGULATING SPEED.
No. 7,322.  Patented Apr. 30, 1850.
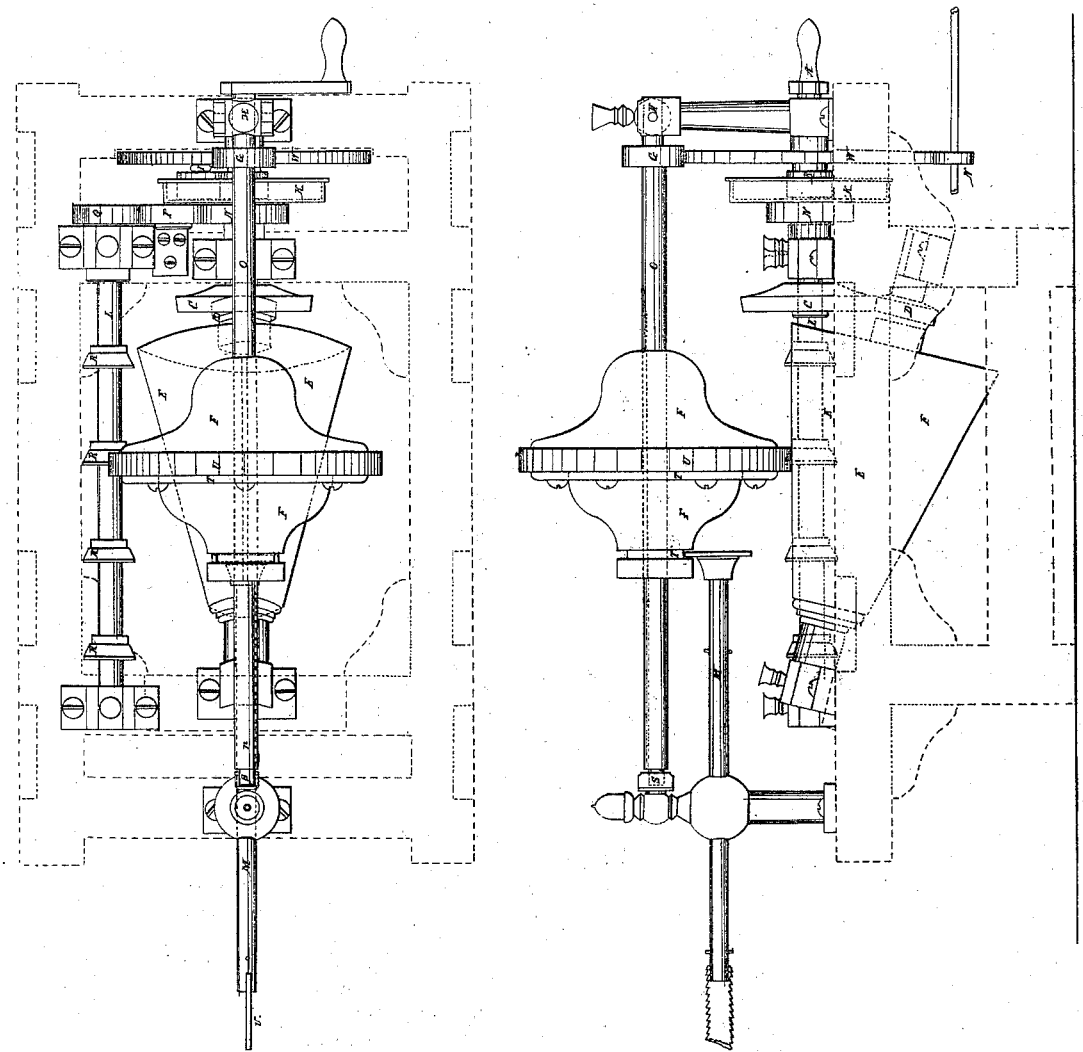

UNITED STATES PATENT OFFICE.

HOSEA ELLIOTT, OF MANCHESTER, NEW HAMPSHIRE.

GEARING FOR REGULATING SPEED.

Specification of Letters Patent No. 7,322, dated April 30, 1850.

*To all whom it may concern:*

Be it known that I, HOSEA ELLIOTT, of Manchester, in the county of Hillsborough and State of New Hampshire, have invented a new and useful improvement in the mode of transmitting the speed of the cone to the compound gears in cotton-speeders and similar machines which require a varying motion to be given to the bobbin, of which the following is a full and exact description.

A cone E, is placed in any convenient part of the machine with the large end depressed so that the upper side may be horizontal. Over this cone is placed a shaft O, called the governing shaft, parallel with the upper surface of the cone. The speed of this shaft regulates the speed of the compound and also the traverse being connected with the compound by the gears G, W, and with the traverse or worm shaft by the gears N, W, it is driven by the pulley or collar F, the edge or rim of which bears on the upper surface of the cone, and is driven by it.

The cone may be made in the usual way and covered or fluted to increase the friction of the pulley. The edge U, of the pulley F, should be made of some firm material yet susceptible of slight compression. To construct the pulley most conveniently, first prepare the shaft O, with the spline P, the length of the cone, upon it fit two plates T of iron a little less in diameter than you intend to make the collar U. Between these plates on the shaft put several washers of hard leather, compress them firmly together by screws passing through them from one plate to the other. It may then be trued in a lathe or otherwise. This pulley is made to traverse the cone lengthwise by means of a rack V, attached to the hub on one of the plates T, by the swivel Y. The rack may be attached to the traverse rail in the usual way.

The shaft O, is supported at one end by the revolving box H, so as to allow the opposite end in the box S, to rise and fall freely in order that the collar U, may press freely on the cone.

Thus my invention consists in the employment of the wheel or pulley F, for transmitting the speed of the cone to the governing shaft, by this means the different speeds of the cone is communicated to the compound with greater accuracy, requiring less care and skill in operating the machine, and also lessens the expense.

What I claim therefore as my invention and for which I wish to obtain Letters Patent is—

The employment of the wheel or pulley F in combination with the cone and governing shaft O, substantially in the manner and for the purpose herein set forth.

In witness whereof, I have hereunto subscribed my name the twelfth day of March eighteen hundred and fifty.

HOSEA ELLIOTT. [L. S.]

In presence of—
I. S. ABBOT,
J. S. S. CUSHING.